United States Patent Office 3,420,857
Patented Jan. 7, 1969

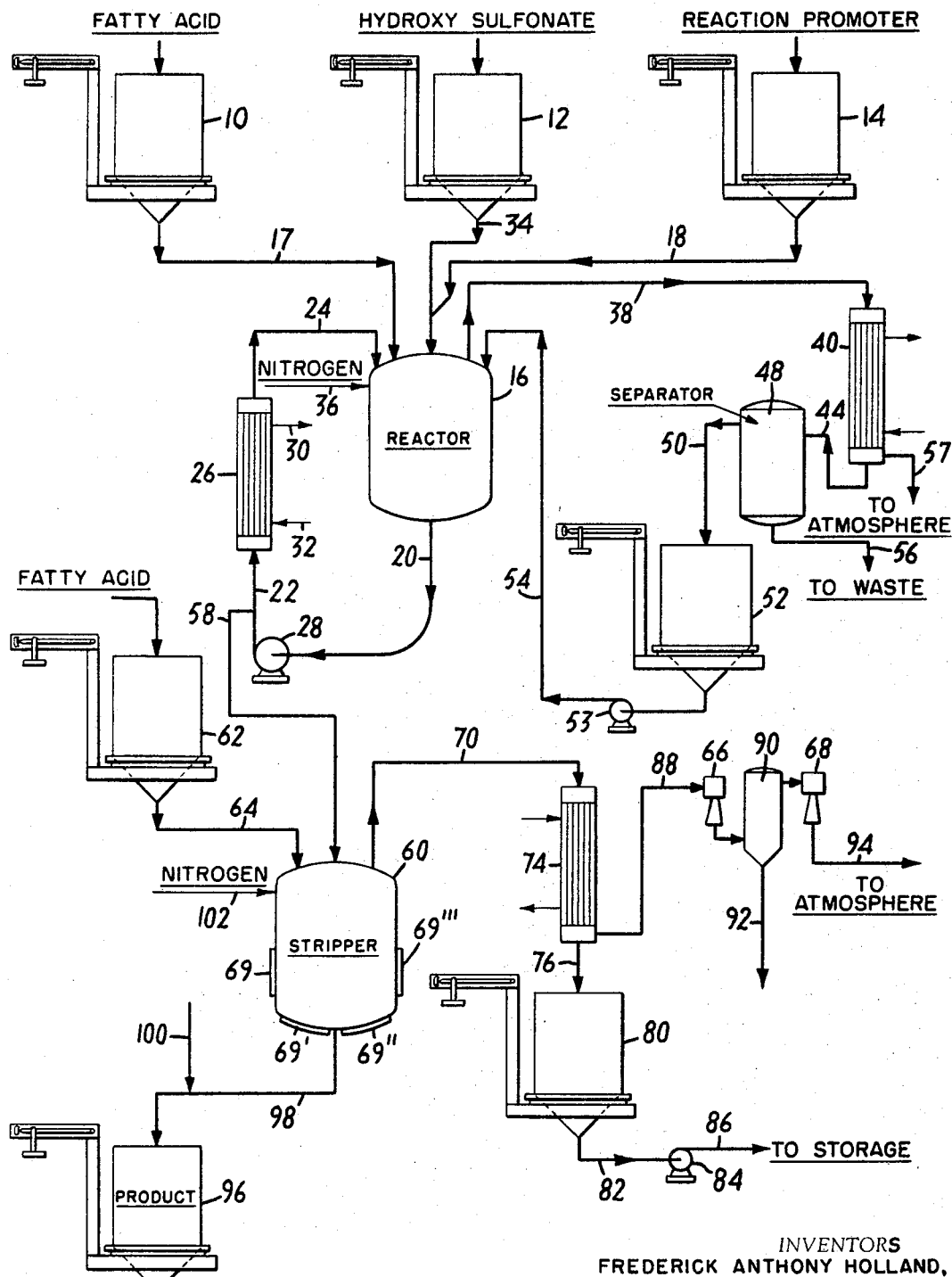

3,420,857
PROCESS FOR THE CONTINUOUS PRODUCTION OF FATTY ACID ESTERS OF HYDROXY SULFONATES
Frederick Anthony Holland, North Bergen, Gerard Joseph McCrimlisk, Saddle Brook, and William A. Kelly, Teaneck, N.J., assignors to Lever Brothers Company, New York, N.Y., a corporation of Maine
Filed Dec. 11, 1964, Ser. No. 417,589
U.S. Cl. 260—400       10 Claims
Int. Cl. C07c *143/12;* C07c *143/52;* C11d *1/12*

ABSTRACT OF THE DISCLOSURE

An improved method for the formation of fatty esters of hydroxy sulfonates is disclosed characterized by continuously supplying to the reaction kettle, during the course of the reaction, fatty acid reactants of a composition corresponding to fatty acids volatilized during the course of the reaction, by means of which it is possible to reduce the proportion of esters of relatively higher molecular weight fatty acids which are formed. Also disclosed is the use of this improved method in conjunction with an improved process for stripping of unreacted fatty acids from the finished reaction mass to reduce the content of the lower molecular weight fatty acids.

---

The present invention relates to the preparation of surface-active agents. More particularly, it relates to a process for preparing surface-active agents of the general formula $RCOOR'SO_3M$ where R is a monovalent aliphatic hydrocarbon radical having from 5 to 19 carbon atoms, R' is selected from the group consisting of divalent aliphatic hydrocarbon radicals containing 2 to 4 carbon atoms and aryl and alkyl-aryl radicals containing 6 to 8 carbon atoms, and M is an alkali metal, particularly sodium or potassium. The process to which the present invention relates is one in which the foregoing compounds are prepared by the direct esterification of an alcohol of the formula $HOR'SO_3M$ with an organic acid of the formula RCOOH.

In carrying out this reaction, the organic acids which are suitable for the manufacture of surface-active agents may be used. In general, these are the mixed acids of aliphatic hydrocarbons having 6 to 20 carbon atoms, containing up to about 25% free fatty acids having from 6 to 10 carbon atoms. Such acids include the unsubstituted, saturated or unsaturated, straight-chain fatty acids, such as acids derived from palm oil or palm kernel oil, acids derived from coconut oil, acids derived from babassu oil and acids derived from ouri curi oil. Synthetic acids may also be used, such acids being obtained from petroleum fractions such as the oxo and Koch process or by the polymerization of alpha olefins. Aliphatic acids of the foregoing types may be employed as mixtures, and the mixture should contain a predominating amount of fatty acids containing about 14 carbon atoms or less.

As compounds of the formula $HOR'SO_3M$ (hereinafter also referred to as the second reactant) it is preferred to use a compound in which R' is a divalent hydrocarbon radical containing 2 to 4 carbon atoms, particularly ethylene, methylethylene, dimethylethylene, propylene or butylene. R' may also be an aryl or alkyl-aryl group containing from 6 to 8 carbon atoms. M is preferably an alkali metal, especially sodium or potassium. The second reactant may be conveniently prepared by the reaction of an epoxide, for example ethylene oxide, propylene oxide, butylene oxide or styrene oxide with sodium bisulfite. Examples of compounds suitable for use as the second reactant are sodium isethionate, potassium methyl isethionate, sodium dimethyl isethionate, sodium 3-hydroxy-propanesulfonate and potassium phenyl isethionate.

In order to achieve a high utilization of the hydroxysulfonate, the reaction is normally carried out using an excess of the acid reactant. In general, at least 1.2 moles of acid per mole of hydroxy-sulfonate are employed, and the amount of excess acid may exceed 2 moles per mole, although for commercially practical processes, mole ratios in excess of 2 are neither necessary nor preferred. The excess acid, in addition to producing a high utilization of the hydroxy-sulfonate, assists in maintaining the product in liquid form during the reaction and in reducing formation of foam.

The direct esterification reaction between these materials is known to be a difficult reaction. Accordingly, it is preferred to employ a reaction promoter to promote high, commercially acceptable yields of the desired product. It will be understood, however, that the present invention is not concerned with the use of reaction promoters and that the use of such compounds is not necessary to the practice of this invention. Compounds which have been successfully employed as reaction promoters include the salts of strong acids and weak bases such as aluminum sulfate, zirconium sulfate, stannous sulfate, titanium sulfate, cadmium sulfate, tungsten phosphate; acids or acid formers such as chloroacetic acid, ethyl chloroformate, coconut fatty acid chloride, boric acid, para-toluene sulfonic acid; neutral or basic compounds such as aluminum oxide and aluminum soap, cerium oxide, lanthanum oxide, didymium oxide, zirconium and zirconyl soaps, zinc oxide and zinc soaps, magnesium oxide and magnesium soap.

In the presence of such reaction promoters, the reaction may be satisfactorily carried out at temperatures of 390°–465° F. In the absence of such promoters, higher temperatures, such as up to about 500° F., are usually necessary to avoid premature cessation of the reaction.

In carrying out commercially practical processes for the foregoing reaction, complete reaction is not normally obtained. The reaction product, therefore, will contain significant amounts of unreacted fatty acids. Because the fatty acids of lower molecular weight, and most especially the free fatty acids having less than about 12 carbon atoms, are undesirable in detergent products, it is necessary to remove at least a portion of these fatty acids.

For this purpose a stripping step is conveniently employed. However, stripping of the uncombined fatty acids from the reaction product is not without difficulties. As noted above, the presence of free fatty acids in the reaction mass is important from the standpoint of imparting fluidity thereto. As these fatty acids are removed in the stripping step, the reaction mass becomes stiff and unmanageable.

This difficulty with the stripping process can be overcome by providing for the presence of a free fatty acid of higher molecular weight. In selecting the free fatty acids for this purpose, several factors are important. The free fatty acids of higher molecular weight are fluid under stripping conditions, and therefore will maintain the fluidity of the reaction mass. Moreover, because of their relatively low volatility, they will not be vaporized to a large extent during stripping. Finally, the free fatty acids of higher molecular weight are a useful additive to the hydroxy sulfonate ester products. Therefore, such materials may be used without interfering with end-use properties of the ester product, where other materials having appropriate melting points and vapor pressures would be undesirable contaminants.

Fatty acids particularly suitable for this purpose have between about 14 and 25 carbon atoms. Preferably the $C_{16}$ or $C_{18}$ fatty acids, or mixtures thereof, are employed.

This improvement on the stripping process does not, however, exhaust all the practical problems which are encountered. Specifically, the free fatty acids added to the stripping step tend to combine with the unreacted hydroxysulfonate. This tends to enrich the final product in esters of the hydroxysulfonates with higher molecular weight fatty acids.

The enrichment with respect to the esters of the high molecular weight fatty acids is further accentuated by the manner in which the reaction is carried out. Conventionally, the reaction is carried out as a simple batch process. Thus, the hydroxysulfonate and fatty acids employed as the reactants are combined in a reaction vessel and the entire mass is heated and agitated for a period of time sufficient to react the isethionate and free fatty acids as completely as practical.

During the course of the reaction, water is evolved as a by-product. Because of the temperature involve, between about 390° F. and 500° F., the water generated by the reaction vaporizes rapidly. The vaporization of water tends to carry off the more volatile components of the fatty acid reactants. The overhead vapors from the reaction have been found to contain fatty acids having up to about 14 carbon atoms. Obviously, the lower molecular weight fatty acids, e.g. the $C_8$, $C_{10}$ and $C_{12}$ fatty acids, will volatilize in even greater proportions.

As a result of the volatilization of the lower molecular weight fatty acids, the product from the main reaction kettle tends to be deficient in the lower molecular weight fatty acid hydroxysulfonates, e.g. esters of fatty acids having 14 carbon atoms or less. This deficiency, when combined with the tendency of the stripping step to cause enrichment in esters of the high molecular weight fatty acids, leads to ester products containing a proportion of the higher molecular weight fatty acid esters substantially in excess of the proportion of such acids in the initial acid reactant.

It has been found that if the manufacture of the hydroxysulfonate esters is carried out as just outlined, that is, carrying out the reaction in a simple batch reaction and stripping off unreacted lower molecular weight free fatty acids in the presence of higher molecular weight fatty acids, detergent bars made from the resulting product tend to be deficient in lathering. The lathering deficiency is particularly noticeable in cold water lathering tests. It is believed that the lathering deficiency results from the disproportionate amounts of higher molecular weight esters of the hydroxysulfonates.

To ameliorate the deficiency in the proportion of the lower molecular weight fatty acid esters of the hydroxysulfonates, the stripping step is carried out in two steps: In the first step, the reaction mass is subjected to a vacuum of at least about 10 inches of mercury. During this first step, a portion of the fatty acid strips off from the reaction mass. Because the stripping temperatures are substantially the same as the reaction temperatures, the conditions are appropriate for further reaction of free fatty acids and the hydroxysulfonates. This reaction will, therefore, occur (or continue), thereby further reducing the amount of unreacted hydroxysulfonate. To the extent that this reaction continues with the lower molecular weight fatty acids during the initial portion of the stripping step, the ultimate proportion of esters of the lower molecular weight fatty acids in the final product is increased relative to the content of esters of higher molecular weight fatty acids.

The vacuum during the first portion of the stripping step may be any convenient level. Usually a vacuum of at least about 10 inches of mercury is needed to obtain a reasonable amount of distillate. The vacuum may, under appropriate conditions be as high as obtainable with the equipment used. In this respect, however, there is usually a foaming problem during the early stages of stripping. With equipment of a reasonable size, it will be preferred to limit the vacuum during the first step to about 20 inches of mercury to avoid excessive foam volumes.

The first step of the stripping process is continued for a period of time of at least about 15 minutes, but not so long that the mass being stripped completely loses its fluidity. After the first stripping step has continued for an appropriate period of time, a quantity of higher molecular weight fatty acid (containing from about 14 to about 25 carbon atoms) is added and stripping is continued. The vacuum need not be increased. However, it is usually preferred to increase the vacuum to as high a vacuum as is obtainable with the equipment used. Generally, a vacuum should be in excess of about 25 inches of mercury in order to obtain the most effective removal of the lower molecular weight fatty acids.

The amount of higher molecular weight fatty acids added during the second step should be at least about 10 parts for each 100 parts (by weight) of the partially stripped reaction mass, and sufficient to maintain the fluidity of the mass during the terminal stages of the stripping process. Excessive quantities of fatty acids, i.e. more than about 50 parts per 100 parts of partially stripped reaction mass are preferably not used since excessive amounts would ultimately have to be removed from the reaction product before it can be incorporated into a detergent formulation. However, large amounts, i.e. in excess of about 50 parts per 100 parts of partially stripped reaction mass, are obviously effective for the purpose of maintaining the fluidity of the mass being stripped of lower molecular weight fatty acids during the terminal stages of the stripping process and may be used within the broadest concept of this process. In the preferred embodiments of this process between about 15 and 20 lbs. of acid are added for each 100 lbs. of reaction mass.

Suitable acids which may be used during the stripping step include: lignoceric acid, myristic acid, archidic acid, behenic acid, palmitic acid, stearic acid, oleic acid, isooleic acid, octadecenoic acid, ricinoleic acid, erucic acid, eleostearic acid, palmitoleic acid, linoleic acid, dihydroxystearic acid, and the mixed higher fatty acids derived from naturally-occurring oils and fats such as lard, tallow, palm kernel oil, myristica fat, stearin, seed fats, linseed oil, cottonseed oil, fish oils, whale oil, tall oil, rosin, greases, soybean oil, olive oil, babassu oil, castor oil, peanut oil, and mixtures of any of such acids. Suitable acids should have an iodine value of less than about 20. If the normal value of the naturally-occurring acid is higher, it may be used after appropriate hydrogenation.

The preferred acids are mixtures of sixteen carbon and eighteen carbon saturated fatty acids, i.e., palmitic and stearic acids. 30–70, 50–50 and 70–30 mixtures of stearic and palmitic acids are commercially available, and these can be used. Commercially available triple-pressed stearic acid and its mixtures with palmitic acid are especially preferred binder-plasticizers.

Delaying the addition of fatty acids during the stripping step, as outlined above, will produce a significant improvement in the lathering properties of hand bars prepared from the reaction product. Further improvement in lathering properties may, however, be desirable.

In accordance with the present invention, a further improvement is provided by recycling some or all of the fatty acid distillates which are recovered during the course of the process. Two distinct distillates are recovered. One is the condensate obtained by condensing the vapors which leave the reactor during the course of the principal reaction. This condensate comprises both water and lower molecular weight fatty acids. The second condensate is the material recovered by condensing the vapors produced in the stripping step. This material usually contains most of the fatty acids present in the initial reactant. However, it will be somewhat enriched in lower molecular weight fatty acids.

In the present invention, therefore, the operation of the main reaction kettle is modified to provide for the continuous injection during the course of the reaction of lower molecular weight fatty acids which approximate in amount and composition the fatty acid portion of the reactor vapors. By continuously injecting such fatty acids, the proportion of lower molecular weight esters of hydroxysulfonates is increased relative to the amount of high molecular weight esters, thereby a product of improved lathering properties is obtained.

The acids injected to the reaction kettle may conveniently be the same fatty acids which are recovered by condensation. It is not necessary, however, to do so, and in some instances it may be impractical to recycle the same fatty acids which are condensed from the vapors leaving the reaction kettle.

A typical instance arises when a reaction mixture of a hydroxysulfonate and fatty acids for the preparation of hydroxysulfonate esters is first brought to the reaction temperature. At this early stage of the reaction, there may not be a sufficient inventory of fatty acids accumulated to permit these acids to be conveniently recycled. In such a case, it may be more convenient, therefore, to provide for the injection of lower molecular weight fatty acids derived from an independent source at the approximate rate and in the approximate proportions as the fatty acids which are vaporized from the main reactor so that a sufficient inventory of condensed fatty acids may be accumulated to permit convenient recycle of them.

The practice of this invention may be further understood by reference to the drawing which illustrates a simplified process flow diagram in which the present invention is employed.

The quantity of aliphatic acids to be employed in a batch, normally in excess of the stoichiometrically required amount as noted above, is measured in a scale tank 10. Simultaneously, the amount of hydroxysulfonate reactant is measured in scale tank 12. As mentioned, the mole ratio of fatty acid to hydroxysulfonate should be at least about 1.2:1. A slurry of the reaction promoter is prepared and stored in vessel 14. Generally, about 0.05 to about 2% reaction promoter (based on the weight of the reaction mass) should be provided. Normally, the amount of reaction promoter is sufficiently small in volume that a scale tank need not be provided and, in fact, the reaction promoter slurry may be conveniently prepared in a suitable pail.

The temperature of the reactants in scale tanks 10 and 12 is not important although from the standpoint of heat economy they should be as warm as possible. Typically, the temperature of the reactants will be in the order of 100°–250° F. but below the boiling point of the reactants.

In carrying out the process, the fatty acids are charged into reactor 16 from scale tank 10 via pipe 17 and thereafter the catalyst slurry which had been prepared is added via pipe 18. After the addition of the acid reactant and catalyst, reactor 16 is closed. The materials therein are circulated through pipes 20, 22 and 24 forming a recirculation loop containing heat exchanger 26. A pump 28 is provided to circulate the materials through the recirculation loop. A heating medium is supplied at a low rate to heat exchanger 26 (through pipes 30 and 32 leading respectively to and from a heater or steam generator, not shown).

After the circulation through the recirculation loop has been started, the hydroxysulfonate reactant is charged into the reactor 16 from its scale tank 12 via pipe 34. The heating is continued for about an hour during which time free water associated with the hydroxysulfonate is distilled and the entire mass is heated to a temperature of about 450° F.

It has been found through experience that the hot reaction mass is sensitive to oxidation by air. For this reason, care must be taken to avoid the presence of air in the reactor after the reactants have been charged. For this purpose a nitrogen purge is provided in the vapor space of the reactor by pipe 36 at a rate sufficient to sweep away the undesired air. For most favorable results, nitrogen which is substantially free of oxygen, i.e. containing less than about 10 p.p.m., is preferably employed for this purpose. The nitrogen purge is admitted through pipe 36 immediately upon closing the reactor and before the reaction mass has been heated.

Water associated with the hydroxysulfonate charge is driven off during the initial heating and leaves via pipe 38 together with the nitrogen purge. The water is condensed in condenser 40 and the condensate flows through pipe 44 to a water separator 48. Any fatty acids which have co-distilled with the water are separated in the separator 48 and accumulated via pipe 50 in scale tank 52. Acids from scale tank 52 are pumped by pump 53 and pipe 54 back to reactor 16 at a rate sufficient to maintain a constant liquid level in scale tank 52. Water from the separator 48 is discharged to the drain 56. Uncondensed vapors and nitrogen leave the condenser 40 via pipe 57.

After the reaction mass has been brought to a temperature of about 430°–480° F., the reaction is continued at this temperature for a period of about 60 to 150 minutes. During this time the direct esterification of the hydroxysulfonate is carried as far as practical, the conversion of the hydroxysulfonate in the reactor normally being about 75%–85%. During the continuance of the reaction, additional water formed as a by-product of the reaction is evolved and condensed in condenser 40 together with additional amounts of fatty acids which had been vaporized. This condensate also is collected in separator 48, the water being discharged to the drain and the fatty acid recovered being accumulated in scale tank 52. The accumulated fatty acids are continuously recycled throughout the course of the reaction period, again maintaining a substantially constant liquid level in scale tank 52.

After the time allowed for the reaction has elapsed, the entire contents of reactor 16 are discharged via pipes 20 and 58 to a vacuum stripper 60. The stripper 60 is then partially evacuated by means of jet evacuators 66 and 68 and the vapors leaving the stripper through pipe 70 are condensed in condenser 74. After about 15–45 minutes, a quantity of a higher molecular weight fatty acid is added to the stripper 60 from a scale tank 62 via pipe 64. This acid is added to assist in the stripping of the excess lower molecular weight fatty acids remaining after the completion of the reaction. Following the addition of the fatty acid, the vacuum is increased to as high a level as is obtainable. During stripping, the temperature is maintained at about 400°–500° F. by means of steam jacket 69–69'''. The condensate recovered by stripping, consisting largely of unreacted lower molecular weight fatty acids, is collected via pipe 76 in a scale tank 80. From scale tank 80 it is pumped via pipe 82, pump 84 and pipe 86 to a storage tank (not shown) and held for use in subsequent batches.

Uncondensed vapors and nitrogen leave the condenser 74 via pipe 88 and are exhausted to the atmosphere via the two-stage jet evacuator 66 and 68. As illustrated, a condenser 90 and a barometric leg 92 are provided intermediate the two-stages 66 and 68. Pipe 94 from the second stage 68 discharges to the atmosphere.

After a sufficient amount of condensate has been removed to purify the hydroxysulfonate ester to the extent desired, the vacuum in stripper 60 is released and the entire mass therein is discharged to a holding tank 96 via pipe 98. Water is inejcted into pipe 98 at pipe 100 to flash cool the purified hydroxysulfonate ester.

Prior to the flash cooling step, it is necessary to maintain the temperature of the mass at least above about 350° F., since below that temperature the reaction product freezes to a solid mass. Because the contents of the stripper are also at an elevated temperature, it is necessary to maintain a slight nitrogen purge therethrough. For this purpose, nitrogen is admitted to stripper 60 via pipe 102. Analogous to the nitrogen purge in reactor 16, the nitrogen purge in stripper 60 is preferably substantially free of molecular oxygen.

It will be understood that the reaction conditions mentioned above, namely, time and temperature, are merely illustrative. The direct esterification reaction may be carried out at temperatures as low as about 390° F. At lower temperatures, obviously a longer time will be required. Furthermore, at the expense of conversion, the reaction may be terminated after less than the reaction time mentioned above.

The following examples further illustrate the present invention. Example 1 presents in greater detail the typical operating conditions of the process described immediately above, while Examples 2 to 4 illustrate by analysis of the various streams in the above apparatus, the significance of the present invention.

EXAMPLE 1

3800 lbs. of coconut fatty acids were weighed into scale tank 10. A slurry containing approximately 75% by weight of sodium isethionate, the slurry containing 2027 lbs. of sodium isethionate on a 100% pure basis were charged into stock tank 12. Finally, 8 lbs. of zinc oxide were prepared as a slurry in tank 14.

All of the foregoing ingredients were charged into the reactor and heated therein to a temperature of about 450° F. by circulating the contents of tank 16 through heat exchanger 26 via pump 28.

When the temperature of the reaction mixture reached about 380°–400° F. water evolved by the reaction together with steam distilled fatty acids began to distill from the reactor. These vapors were condensed in condenser 40. The fatty acids and water condensate were collected in separator 48 in which separator the fatty acids were decanted via pipe 50 and accumulated in tank 52.

The fatty acids in tank 52 were continuously recycled to the reactor 16 by means of a proportioning pump in line 54 which was automatically controlled to maintain a constant level of fatty acids in the collecting tank 52.

The reaction was essentially complete in approximately 150 minutes at 450°–460° F., and both fatty acids and water ceased to accumulate in the separator 48.

At this point, the reaction mixture was drained in the stripper 60 which was also purged with nitrogen to maintain an oxygen-free atmosphere. By circulating a heat transfer liquid through the jacket of stripper 60 the temperature of the reaction mixture was maintained between about 430° and 460° F.

A vacuum was applied by means of ejectors 66 and 68 to obtain a vacuum of about 20 inches of mercury. After maintaining this vacuum for a period of about 15 minutes, 963 lbs. of molten stearic acid from tank 62 was charged into stripper 60 to maintain the fluidity of the reaction product therein after the initial portion of unreacted fatty acids had been removed. The removal of the unreacted fatty acids of the charged stock was completed by further increasing the vacuum to about 27½ inches of mercury and maintaining it at this level, while the mass in the stripper was maintained at 450° F., for a period of about 45 minutes. At this point, the pressure was brought back to atmospheric by shutting off the vacuum ejectors and introducing nitrogen into the stripper.

After analyzing the completed batch of acyl isethionate, the reaction product, weighing 5750 lbs., was discharged and cooled. The analysis showed that the acyl isethionate content was about 75%, corresponding to a yield of about 92% based on the isethionate charged to the reactor.

EXAMPLE 2

The significance of employing a two-step stripping process becomes apparent upon an analysis of the reaction products.

A batch of the coconut fatty acid esters of sodium isethionate was prepared following the process as outlined in Example 1. In stripping the unreacted lower molecular weight fatty acids from the reacton product, the injection of the higher molecular weight fatty acids was delayed for a period of about 30 minutes from the time that the vacuum was first pulled (this corresponds to a stripping period of about 15 minutes at 20″ vacuum).

A sample of the resulting coconut isethionate was hydrolyzed and the distribution of fatty acids was analyzed chromatographically. The following was found:

| | Percent |
|---|---|
| $C_6$–$C_{10}$ | 9.0 |
| $C_{12}$–$C_{14}$ | 59.6 |
| $C_{16}$ | 15.1 |
| $C_{18}$ | 16.0 |

Example 1 was repeated except that the lower molecular weight fatty acids recovered from the reactor were accumulated, but were not returned to the reactor. Moreover, in the stripping step the higher molecular weight fatty acids were added to the stripper at the same time as the crude reaction product. No period of delay was provided.

Subsequently, a sample of the coconut isethionate obtained from the reaction was hydrolyzed and the fatty acid recovered was analyzed chromatographically. The fatty acid distribution was as follows:

| | Percent |
|---|---|
| $C_6$–$C_{10}$ | 5.5 |
| $C_{12}$–$C_{14}$ | 50.9 |
| $C_{16}$ | 20.5 |
| $C_{18}$ | 22.3 |

Wash-down tests using bars prepared from the foregoing coconut isethionate samples demonstrated that lathering was significantly improved by the process of the present invention. This improvement is attributable to the increase in the relative proportion of $C_6$–$C_{10}$ acyl isethionates.

EXAMPLE 3

2965 lbs. of coconut fatty acids and 838 lbs. of fatty acids recovered in the stripping step of a previously prepared batch of acyl isethionate were combined in scale tank 10. A slurry containing approximately 75% by weight of sodium isethionate, the slurry containing 2027 lbs. of sodium isethionate on a 100% pure basis were charged into stock tank 12. Finally, 8 lbs. of zinc oxide were prepared as a slurry in tank 14.

All of the foregoing ingredients were charged into the reactor and heated therein to a temperature of about 450° F. by circulating the contents of tank 16 through heat exchanger 26 via pump 28.

When the temperature of the reaction mixture reached about 380°–400° F. water evolved by the reaction together with steam distilled fatty acids began to distill from the reactor. These vapors were condensed in condenser 40. The fatty acids and water condensate were collected in saparator 48 in which separator the fatty acids were decanted via pipe 50 and accumulated in tank 52.

The fatty acids in tank 52 were continuously recycled to the reactor 16 by means of a proportioning pump in line 54 which was automatically controlled to maintain a constant level of fatty acids in the collecting tank 52.

The reaction was essentially complete in approximately 150 minutes at 450°–460° F., and both fatty acids and water ceased to accumulate in the separator 48.

At this point, the reaction mixture was drained in the stripper 60 which was also purged with nitrogen to maintain an oxygen-free atmosphere. By circulating a heat transfer liquid through the jacket of stripper 60 the temperature of the reaction mixture was maintained between about 430° and 460° F.

A vacuum was applied by means of ejectors 66 and 68 to obtain a vacuum of about 20 inches of mercury. After maintaining this vacuum for a period of about 15 minutes, 963 lbs. of molten stearic acid from tank 62 was charged into stripper 60 to maintain the fluidity of the reaction product therein after the initial portion of unreacted fatty acids had been removed. The removal of the unreacted lower fatty acids was completed by further increasing the vacuum to about 27½ inches of mercury and maintaining it at this level, while the mass in the stripper was maintained at 450° F., for a period of about 45 minutes. At this point, the pressure was brought back to atmospheric by shutting off the vacuum ejectors and introducing nitrogen into the stripper.

The fatty acids collected during the stripping were returned to the fatty acid charge tank for reuse in a subsequent reaction.

After analyzing the completed batch of acyl isethionate, the reaction product, weighing 5750 lbs., was discharged and cooled. The analysis showed that the acyl isethionate content was about 75%, corresponding to a yield of about 92% based on the isethionate charged to the reactor.

A sample of the coconut isethionate obtained was hydrolyzed and the fatty acid recovered was analyzed chromatographically. The fatty acid distribution was as follows:

| | Percent |
|---|---|
| $C_6$–$C_{10}$ | 11.8 |
| $C_{12}$–$C_{14}$ | 60.1 |
| $C_{16}$ | 14.9 |
| $C_{18}$ | 13.1 |

The foregoing may be compared with a process in which neither of the distillates recovered (in scale tank 52 and scale tank 80) were recycled and in which no provision was made to delay the addition of the $C_{16}$–$C_{18}$ fatty acids during the stripping step. In such a process, the fatty acid distribution of the resulting product would be as follows:

| | Percent |
|---|---|
| $C_6$–$C_{10}$ | 5.5 |
| $C_{12}$–$C_{14}$ | 50.9 |
| $C_{16}$ | 20.5 |
| $C_{18}$ | 22.3 |

Moreover, comparison of the results of this example with the results obtained in Example 2 shows that by combining the recycle steps with the delayed addition of fatty acids during the stripping step produces further improvements in the fatty acid distribution of the resulting hydroxysulfonate esters.

In this example, the fatty acid reactants had the following approximate composition:

| | Coconut fatty acid (2,965 lbs.) | Fatty acid recovered from the stripper (838 lbs.) |
|---|---|---|
| $C_6$ | 0.2 | 0.7 |
| $C_8$ | 7.1 | 12.7 |
| $C_{10}$ | 6.7 | 9.4 |
| $C_{12}$ | 50.5 | 44.8 |
| $C_{14}$ | 18.4 | 12.6 |
| $C_{16}$ | 7.3 | 14.1 |
| $C_{18}$ | 9.8 | 5.8 |

EXAMPLE 4

The procedure described generally above and in Example 1 was repeated in pilot-plant equipment. In the pilot-plant, for reasons of economy, the reaction vessel was also used as the stripping vessel.

The reactor was charged with 141.5 lbs. of coconut fatty acids, 72 lbs. of sodium isethionate (in the form of a 55% slurry) and 0.29 lb. of zinc oxide. The entire mass was heated to 450° F. and maintained at this reaction temperature for a period of 90 minutes.

During the course of the reaction, lower molecular weight fatty acids distilled from the reactor. To compensate for this loss of lower molecular weight fatty acids, distillates recovered from the reactor during previous experiments was metered to the reactor during the course of the reaction.

At the end of the reaction, the reactor was evacuated until a vacuum of approximately 20 inches of mercury was reached. A period of 20 minutes was required to achieve a vacuum of 20 inches. After the vacuum had been achieved, it was maintained for an additional period of 25 minutes.

At the end of 25 minutes, 25 lbs. of stearic acid were added to the partially stripped mass and the vacuum increased to 28 inches of mercury. This vacuum was maintained for an additional period of 90 minutes.

During the course of the two periods of vacuum stripping, 23.6 lbs. of distillate were recovered.

A sample of the resulting product was analyzed to ascertain the distribution of the fatty acid component of the acyl isethionates. The following was found:

| | Percent |
|---|---|
| $C_6$–$C_{10}$ | 9.4 |
| $C_{12}$–$C_{14}$ | 59.7 |
| $C_{16}$ | 12.9 |
| $C_{18}$ | 17.1 |

Hand bars prepared from the reaction product demonstrated improved lathering properties.

In the practice of this invention, Example 3 may be repeated by substituting the fatty acids derived from ouri curi oil or from babassu oil or the coconut fatty acid mentioned above. Likewise, in place of the sodium isethionate, other hydroxy sulfonates may be used such as potassium methyl isethionate and sodium benzyl isethionate.

In place of the stearic acid mentioned in the above Example 3, commercial palmitic acid may be used.

It will be understood that the foregoing examples of the present invention are given for illustrative purposes only and that the scope of this invention is not to be limited thereby.

We claim:

1. In a process for making a detergent of the formula RCOOR'SO$_3$M wherein R is a monovalent aliphatic acylic hydrocarbon residues having from 5 to 19 carbon atoms, and R' is selected from the group consisting of divalent hydrocarbon radicals having from 2 to 4 carbon atoms and divalent aryl and alkylaryl radicals having from 6 to 8 carbon atoms, and M is an alkali metal cation, the steps of:

(a) heating a mixture of a hydroxy sulfonate of the formula HOR'SO$_3$M and first mixed fatty acids of the formula RCOOH, R, R' and M being as defined above, said first mixed fatty acids including acids having less than about 14 carbon atoms, to a temperature between about 390° F. and 500° F., whereby said reactants combine with each other to liberate water and form a compound of the formula RCOOR'SO$_3$M, said liberated water leaving said mixture as it is formed together with a volatilized portion of said first mixed fatty acids as a vapor, said volatilized portion of said first mixed fatty acids having an average molecular weight which is less than the average molecular weight of said first mixed fatty acids.

(b) continuously supplying to the reacting mass during the course of the reaction a second mixed fatty acid whose composition corresponds to the composition of said volatilized portion of said first fatty acids, said second fatty acids being supplied at the approximate rate at which said volatilized fatty acids are vaporized during the course of the reaction, and continuing the reaction of said hydroxy sulfonate with said first and second mixed fatty acids to form a crude reaction mixture containing residual unreacted hydroxy sulfonate and unreacted fatty acids.

(c) following said reaction, subjecting the crude reaction mixture while at a temperature between about 390° F. and 500° F. to a vacuum of at least 10 inches of mercury for a period of time of at least about 15 minutes, sufficient to strip a portion of the unreacted fatty acids having less than about 14 carbon atoms from said mass, said period further being sufficient to permit at least a portion of said residual unreacted hydroxy sulfonates to react, but not so long that the partly stripped crude reaction mass loses its fluidity, (d) adding to the partially stripped mixture an amount, between about 10 pounds and about 50 pounds of said partially stripped mass, sufficient to maintain the fluidity thereof, of a higher molecular weight fatty acid having from about 15 to about 25 carbon atoms, and (e) continuing the stripping of said mass for a period of time sufficient to remove a further portion of said unreacted fatty acids containing less than about 14 atoms.

2. In a process for making a detergent of the formula $RCOOR'SO_3M$, wherein R is a monovalent aliphatic acylic hydrocarbon residues and R' is selected from the group consisting of divalent hydrocarbon radicals having from 2 to 4 carbon atoms and divalent aryl and alkylaryl radicals having 6 to 8 carbon atoms, and M is an alkali metal cation, the steps comprising:

(a) sequentially heating successive batches of the compound $HOR'SO_3M$ and first mixed fatty acids of the formula RCOOH, R, R' and M being as defined above, and said first mixed fatty acids including fatty acids having less than about 14 carbon atoms, in a mole ratio between about 1:1.2 and about 1:2 to a temperature between about 390° and 500° F., whereby said reactants combine with each other to liberate water and form a detergent of the formula $RCOOR'SO_3M$, said liberated water leaving the reacting mixture as it is formed, together with a volatile portion of said first mixed fatty acids as a vapor, said volatile portion of said first mixed fatty acids having an average molecular weight less than the average molecular weight of said first mixed fatty acids, (b) continuously supplying to each batch during the course of the reaction a mixture of second mixed fatty acids corresponding substantially in composition to the composition of said volatilized fatty acids vaporized during the course of the reaction, said second mixed fatty acids being supplied at the approximate rate at which said volatile fatty acids are vaporized, and continuing the reaction of said hydroxy sulfonate with said first and said second mixed fatty acids to form a crude reaction mixture containing residual unreacted hydroxy sulfonate and unreacted fatty acids.

(c) following the reaction in each batch, heating the crude reaction mixture to a temperature between about 390° F. and 500° F. under a vacuum of at least about 10 inches of mercury for a period of time of at least about 15 minutes, sufficient to strip off a portion of said unreacted fatty acids having less than about 14 carbon atoms, said period of time further being sufficient to permit at least a portion of the residual unreacted hydroxy sulfonate to react, but not so long that the partially distilled crude reaction mixture loses its fluidity, (d) adding to the partially stripped mixture an amount, between about 10 pounds and about 50 pounds per 100 pounds of said partially stripped mixture, sufficient to maintain the fluidity thereof, of a higher molecular weight fatty acid having from about 14 to 25 carbon atoms, (e) continuing the stripping of said mass for a period of time sufficient to remove a further portion of said fatty acids having less than about 14 carbon atoms, and (f) accumulating the fatty acids recovered in stripping steps (c) and (e) from each batch, and using at least a portion of said accumulated fatty acids as a portion of the first acid reactant RCOOH in a subsequent batch.

3. In a process for making a detergent of the formula $RCOOR'SO_3M$, wherein R is an aliphatic acyclic hydrocarbon residue of a $C_5$–$C_{19}$ fatty acid and R' is selected from the group consisting of divalent hydrocarbon radicals containing from 2 to 4 carbon atoms and divalent aryl and alkylaryl radicals containing 6–8 carbon atoms, and M is an alkali metal cation, in which process a compound of the formula RCOOH is reacted with a compound of the formula $HOR'SO_3M$, R', R and M being as defined above, the combination of:

(a) sequentially heating successive batches of the reactants RCOOH and $HOR'SO_3M$, R, R' and M being as defined above in a mole ratio of between about 1.2:1 and about 2:1, to a temperature between about 390° and 500° F., whereby said reactants combine with each other to liberate water and to produce a crude reaction mixture containing a detergent of the formula $RCOOR'SO_3M$, unesterified hydroxy sulfonate of the formula $HOR'SO_3M$ and free fatty acids of the formula RCOOH which free fatty acids include fatty acids containing less than about 14 carbon atoms, and whereby the liberated water leaves the reacting mixture as it is formed together with a portion of the volatile fatty acid reactants contained therein as a vapor, (b) continuously supplying to each batch during the course of the reaction a mixture of free fatty acids at the approximate rates at which fatty acids are vaporized during the course of the reaction and of the approximate proportions of said fatty acids vaporized, (c) following the reaction in each batch, heating said crude reaction mixture to a temperature between about 390° and 500° F. under a vacuum at least about 10 inches of mercury for a period of time of at least about 15 minutes, sufficient to strip off a portion of said unreacted fatty acids containing less than about 14 carbon atoms, said period of time further being sufficient to permit at least a portion of the unesterified hydroxy sulfonate to react but not so long that the partially distilled crude reaction mixture loses its fluidity, (d) adding to the partially stripped mixture an amount, between about 10 pounds and about 50 pounds per 100 pounds of said crude mixture, sufficient to maintain the fluidity of the partially stripped mass, of a higher molecular weight fatty acid containing from about 14 to about 25 carbon atoms, (e) continuing the stripping of said mass for a period of time sufficient to remove a further portion of said fatty acids containing less than about 14 carbon atoms, and (f) accumulating the fatty acids recovered in stripping steps (c) and (e) from each batch, and using at least a portion of said accumulated fatty acids as part of the acid reactant RCOOH in a subsequent batch.

4. A process according to claim 2, wherein said second stripping step (e) is carried out at a vacuum of at least about 25 inches of mercury.

5. A process according to claim 2, wherein the higher molecular weight fatty acid added in step (d) is stearic acid.

6. A process according to claim 2, wherein the higher molecular weight fatty acid added in step (d) is palmitic acid.

7. A process according to claim 2, wherein the higher molecular weight fatty acid added in step (d) is a mixture of palmitic and stearic acids.

8. A process according to claim 2, wherein the amount of higher molecular weight fatty acid added in step (d) is between about 15 lbs. and about 20 lbs. per each 100 lbs. of said crude mixture.

9. A process according to claim 2, wherein first stripping step (a) is carried out at a vacuum between about 10 inches and about 20 inches of mercury.

10. A process according to claim 2, wherein the volatile fatty acids leaving the reaction mixture during heating step (a) are condensed and recycled to the reaction mass from which they vaporized.

References Cited

UNITED STATES PATENTS 3,097,218  7/1963  Kooijman et al. _____ 260—400

NICHOLAS S. RIZZO, *Primary Examiner.*

J. H. TURNIPSEED, *Assistant Examiner.*

U.S. Cl. X.R.

252—161; 260—479, 481

UNITED STATES PATENT OFFICE
CERTIFICATE OF CORRECTION

Patent No. 3,420,857

January 7, 1969

Frederick Anthony Holland et al.

It is certified that error appears in the above identified patent and that said Letters Patent are hereby corrected as shown below:

Column 7, line 2, "inejeted" should read -- injected --. Column 8, line 5, "saparator" should read -- separator --. Column 12, line 10, beginning with "3. In a process" cancel all to and including "subsequent batch." in line 65, same column 12, and insert instead:

3. In a process for making a detergent of the formula RCOOR'SO$_3$Na wherein R is an aliphatic acyclic hydrocarbon residues of a mixture of C$_5$-C$_{19}$ fatty acids and R' is a divalent hydrocarbon radical containing from 2 to 4 carbon atoms, in which process a mixture of fatty acids of the formula RCOOH is reacted with a hydroxy sulfonate of the formula HOR'SO$_3$Na, said fatty acids containing up to about 25% of C$_6$-C$_{10}$ acids, the combination of (a) sequentially heating successive batches of the reactants RCOOH and HOR'SO$_3$Na in a mole ratio of between about 1.2:1 and about 2:1 to a temperature between about 390° and 500° F. whereby said reactants combine with each other to liberate water and to produce a crude reaction mixture containing a detergent of the formula RCOOR'SO$_3$Na, unesterified hydroxy sulfonate and free fatty acids, which free fatty acids include acids containing less than about 14 carbon atoms, and whereby the liberated water leaves the reaction mixture as it is formed together with a portion of the volatile fatty acid reactants contained therein as a vapor, (b) continuously condensing the volatilized fatty acids as they evolve and returning the condensed fatty acids to the reactor, (c) following the reaction in each batch heating said crude mixture to a temperature between about 390° and 500° F. under a vacuum between about 10 inches and about 20 inches of mercury for a period of time between about 15 and about 45 minutes, sufficient to strip off a portion of the unreacted fatty acids containing less than about 14 carbon atoms, said period of time being further sufficient to permit at least a portion of said unesterified hydroxy sulfonate to react, (d) adding to the partially stripped mixture an amount between about 15 lbs. and 20 lbs. per 100 lbs. of said crude reaction mixture sufficient to maintain the fluidity of the partially stripped mass of a higher molecular weight saturated fatty acid containing from about 16 to about 18 carbon atoms, (e) continuing the stripping of said mass at a vacuum of at least about 25 inches of mercury for a period of time sufficient to remove a further portion of said fatty acids containing less than about 14 carbon atoms, and (f) condensing and accumulating the fatty acids recovered in stripping steps (c) and (e) from each batch and using said accumulated fatty acids as a portion of the fatty acid reactant RCOOH of a subsequent batch.

Signed and sealed this 7th day of April 1970.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,420,857                                          January 7, 1969

Frederick Anthony Holland et al.

It is certified that error appears in the above identified patent and that said Letters Patent are hereby corrected as shown below:

Column 11, line 16, after "pounds", second occurrence, insert -- per 100 pounds --.

Signed and sealed this 23rd day of June 1970.

(SEAL)
Attest:

Edward M. Fletcher, Jr.                          WILLIAM E. SCHUYLER, JR.
Attesting Officer                                       Commissioner of Patents